US007664865B2

(12) United States Patent
Parikh et al.

(10) Patent No.: US 7,664,865 B2
(45) Date of Patent: Feb. 16, 2010

(54) SECURELY HOSTING A WEBBROWSER CONTROL IN A MANAGED CODE ENVIRONMENT

(75) Inventors: Sujal S. Parikh, Redmond, WA (US); Lauren B. Lavoie, Seattle, WA (US); Karen Elizabeth Corby, Seattle, WA (US); Mark Alcazar, Seattle, WA (US); Hua Wang, Bellevue, WA (US); Kusuma P. Vellanki, Portland, WA (US)

(73) Assignee: Microsoft Corporation, Redmond, WA (US)

( * ) Notice: Subject to any disclaimer, the term of this patent is extended or adjusted under 35 U.S.C. 154(b) by 753 days.

(21) Appl. No.: 11/355,122

(22) Filed: Feb. 15, 2006

(65) Prior Publication Data

US 2007/0199051 A1    Aug. 23, 2007

(51) Int. Cl.
*G06F 15/16* (2006.01)
*G06F 7/04* (2006.01)
*G06F 17/30* (2006.01)
*H04L 29/06* (2006.01)
*G06F 15/173* (2006.01)

(52) U.S. Cl. ............................. 709/229; 726/4; 709/223

(58) Field of Classification Search .................. 709/229
See application file for complete search history.

(56) References Cited

U.S. PATENT DOCUMENTS 6,324,553 B1 * 11/2001 Cragun et al. ............... 715/236

6,854,016 B1 * 2/2005 Kraenzel et al. ............ 709/229
2003/0041267 A1 * 2/2003 Fee et al. .................... 713/201
2004/0078591 A1 * 4/2004 Teixeira et al. .............. 713/201

OTHER PUBLICATIONS

International Publication No. WO 99/30217, Title: Protection Domains to Provide Security in a Computer System, International Publication Date: Jun. 17, 1999.*

* cited by examiner

*Primary Examiner*—Kenny S Lin
*Assistant Examiner*—Yanet Rodriguez
(74) *Attorney, Agent, or Firm*—Workman Nydegger

(57) ABSTRACT

Described is a technology by which a managed web browser control hosts an unmanaged web OLE control to control navigation requests by the unmanaged web OLE control on behalf of partially trusted code. Site locking may be performed to constrain a site to navigation only to other pages within its site, thereby preventing navigation to an undesirable location. In one example, the unmanaged web OLE control communicates information corresponding to a navigation request to the managed web browser control, and the managed web browser control processes the information to establish whether the navigation is to be allowed or blocked. The benefits of site-locking with respect to privacy are also described, as is z-order management to protect against site spoofing.

11 Claims, 4 Drawing Sheets

SECURELY HOSTING A WEBBROWSER CONTROL IN A MANAGED CODE ENVIRONMENT

BACKGROUND

Web browser functionality may be provided via an ActiveX® control that is hosted by another program code container. For example, one such hosting program is Microsoft Corporation's Internet Explorer component (e.g., iexplore.exe), which is essentially a frame that hosts a browser control web browser ActiveX® control (e.g., shdocvw.dll). Virtually any other application program that wants to add browser functionality to the rest of its program may do so by appropriately hosting such a browser control.

When dealing with web browsing, security is an important consideration, as some websites can be malicious and generally cause problems to a user's computer system when a user visits such a site. For security purposes, the existing Microsoft® Internet Explorer web browser ActiveX® control, also referred to herein as the web OLE (Object Linking and Embedding) control, or WebOC, provides a security model based on the concept of zones. With zone-based security, each website is categorized based on its website address as belonging to a particular zone, namely, Internet, intranet, trusted, or restricted. (The concept of a local machine zone also exists and corresponds to locally-maintained files, but such a zone is not for websites.) Internet Explorer uses the zone information for a given site to allow or deny that site the ability to perform some requested functionality. For example, because the Internet zone is considered less secure than the intranet zone, a webpage from the Internet zone is not allowed to display content referenced via an image tag in the page if that image tag points to a file in the intranet zone (or alternatively points to any more secure zone).

With contemporary operating systems such as Microsoft Corporation's Windows® Vista™-based operating system, the concept of "managed code" needs to be considered with respect to security, wherein managed code generally refers to any software code that contains one or more programs that are not in the CPU's native instruction set and/or have memory functionality managed for them by the system. For example, Windows® Vista™ works with a managed platform (Windows® Presentation Foundation) that is designed to run in a Microsoft®.Net environment, which is a managed code environment.

Regarding Internet security, the security model of at least one such managed code environment, e.g., the .Net environment, is not based on zones, but rather is based on Code Access Security (CAS). In the CAS model, a program runs with full trust or with partial trust. More particularly, in the CAS model, managed code can run in a full trust context with a full set of rights and privileges, or in a partial trust context with some lesser subset of rights and privileges. In general, in full trust, code is allowed to do essentially anything, while in partial trust, the code is allowed to only do those things for which it has permissions. For example, application code with full trust can read and write files to a hard disk, but partial trust application code cannot do the same, unless the code has an appropriate permission, e.g., a FileIO permission. When an application program is launched from the Internet, by default the application program is not given the FileIO permission, thereby preventing that program from performing file read/write operations.

For security reasons, in a managed code environment, the appropriate permissions are needed to run unmanaged code. The web OLE control is written in unmanaged code, and the permission to run unmanaged code is not granted to partially trusted code that is launched from the Internet. As a result, in a managed code environment, the web OLE control needs to be run by fully trusted code, e.g., the platform (Windows® Presentation Foundation) code after asserting for the "unmanaged code" permission. Note that platform code, which is signed and trusted, has the ability to elevate permissions so as to do specific work on behalf of partially trusted code; this way, the platform can provide a way for partial trust code to perform operations in a controlled manner, such as to access certain files.

The platform code that launches and hosts the web OLE control itself may be a managed control that is part of the platform code, and hence is able to assert the "unmanaged code" permission. However if this hosting control simply elevated permissions and instantiated the unmanaged web OLE control, then the hosting site could navigate essentially anywhere, including navigating to local content or to non-originating websites. This would be an unacceptable security flaw.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a managed web browser control hosts an unmanaged web OLE control to control navigation requests by the unmanaged web OLE control on behalf of partially trusted code. Site locking may be performed to constrain a site to navigation only to other pages within its site, thereby preventing navigation to an undesirable location.

In one example implementation, the unmanaged web OLE control communicates information corresponding to a navigation request to a managed application framework (essentially managed wrapper code over the unmanaged web browser control), and the managed web browser control processes the information to establish whether the navigation is to be allowed or blocked. For example, an object creation request is made, using the parameters of the current site and the desired URI (uniform resource identifier); if creation is successful, navigation is allowed, otherwise it is blocked.

The benefits of site-locking with respect to privacy are also described, as is z-order management to protect against site spoofing.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
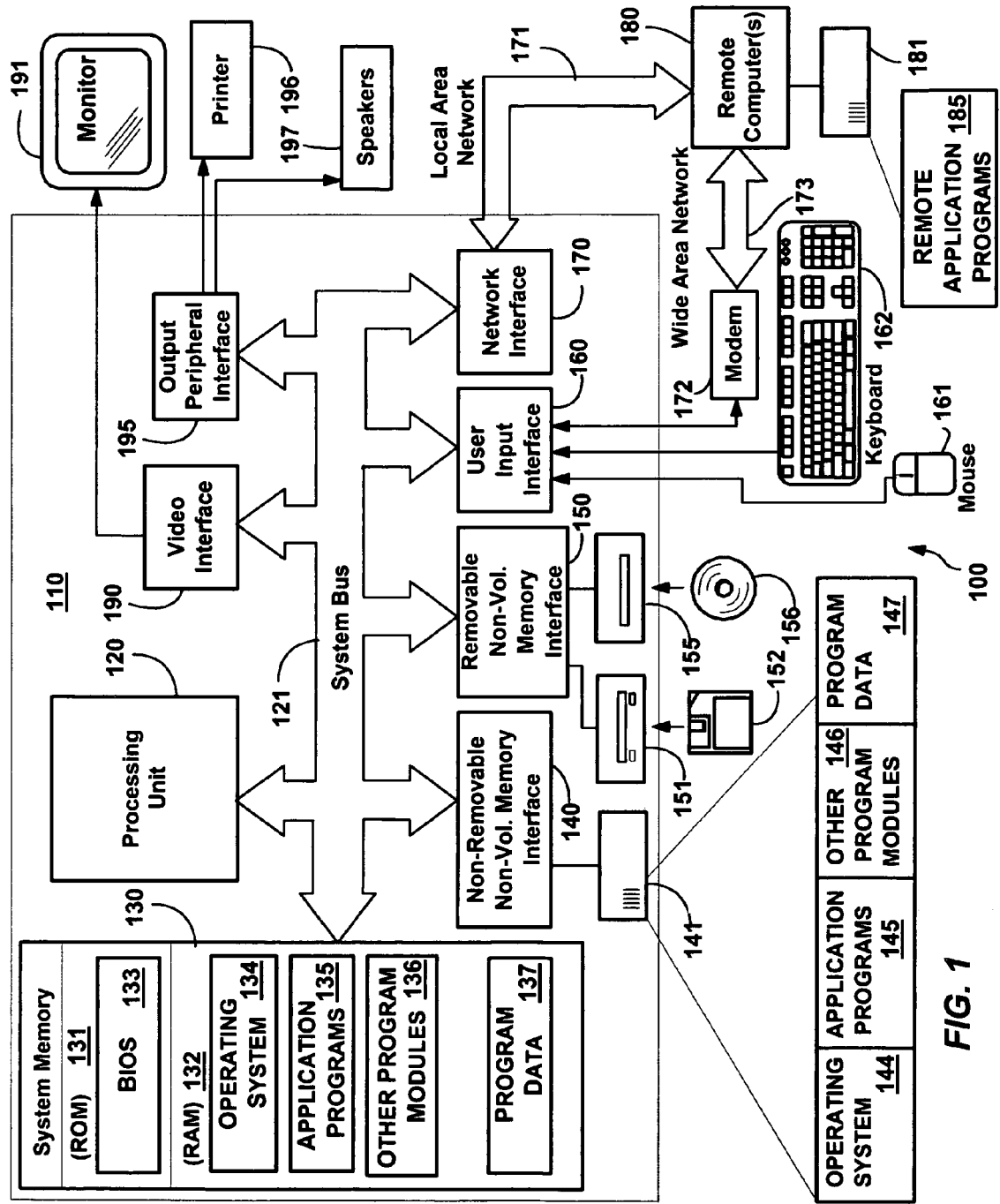
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, a microphone, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 195 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It may be appreciated that the network connections shown are exemplary and other means of establishing a communications link between the computers may be used.

Securely Hosting a Control in a Managed Code Environment

Figure 2:
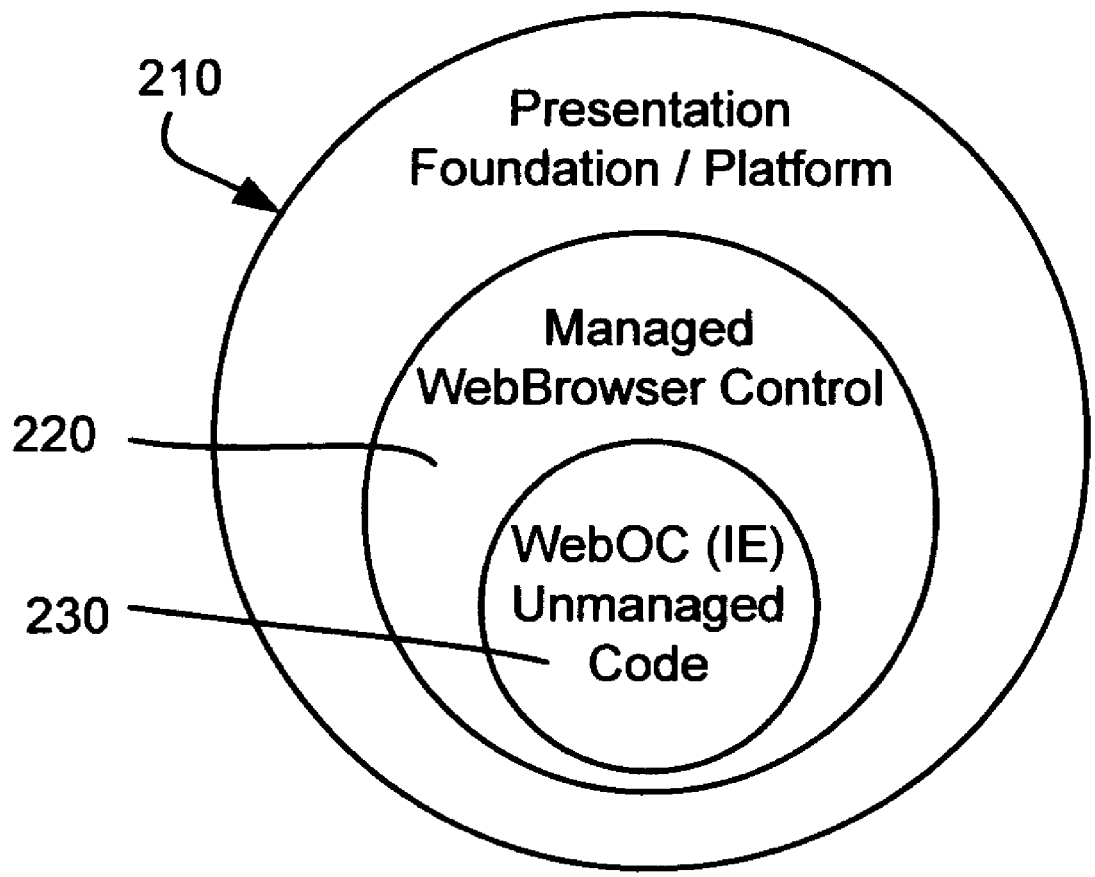
FIG. 2 is a representation of an unmanaged web OLE control hosted by a managed browser control in a presentation foundation/platform useable in a managed code environment.

Various aspects of the technology described herein are directed towards an example model, generally represented in FIG. 2, in which managed code, in the form of a control referred to herein as a WebBrowser control 220, runs in a managed presentation foundation/platform code environment 210. In general, the WebBrowser control 220 launches and hosts an unmanaged control (e.g., the web OLE control 230) in such a way that it allows the hosted control 230 certain capabilities, such as to render HTML and the like, while at the same time restricting the control's functionality to provide some of the same protections that are provided via a zone-based security model (as well as facilitating privacy, as described below). To this end, site locking technology is described, which in an appropriate situation confines the web OLE control 230 to the site from which a partially trusted program (e.g., web browser application) that uses the web OLE control 230 was deployed. Notwithstanding, the various aspects described herein are not limited to site-locking technology, nor to any of the particular examples used herein, but rather the technology provides numerous benefits and advantages to computing in general.

Note that even though a hosted web OLE control 230 can implement zone security, security problems can arise in a managed code environment. By way of an example, consider an HTML page (e.g., obtained from http://www.aaa.com/main.htm) that contains an IFRAME that points to a file, in this example named file://c:/file/sensitive-info.htm. With a zone-based security model where managed code is not an issue, the browser component (e.g., Internet Explorer, comprising the unmanaged web OLE control) will refuse to render the internal IFRAME because main.htm is in the Internet zone, while sensitiveinfo.htm is in the localmachine zone, which is a higher security zone than the Internet zone. An attempt to navigate to a higher security zone is called a zone-elevation attempt, and is blocked by the browser component. However, if the browser component itself was navigated (e.g., directly by the local user) to the file named file://c:/file/sensitive-info.htm, then the navigation would not be blocked, because in such a direct navigation there is only one zone in effect, namely the localmachine zone, and thus there is no zone elevation attempt.

Figure 3:
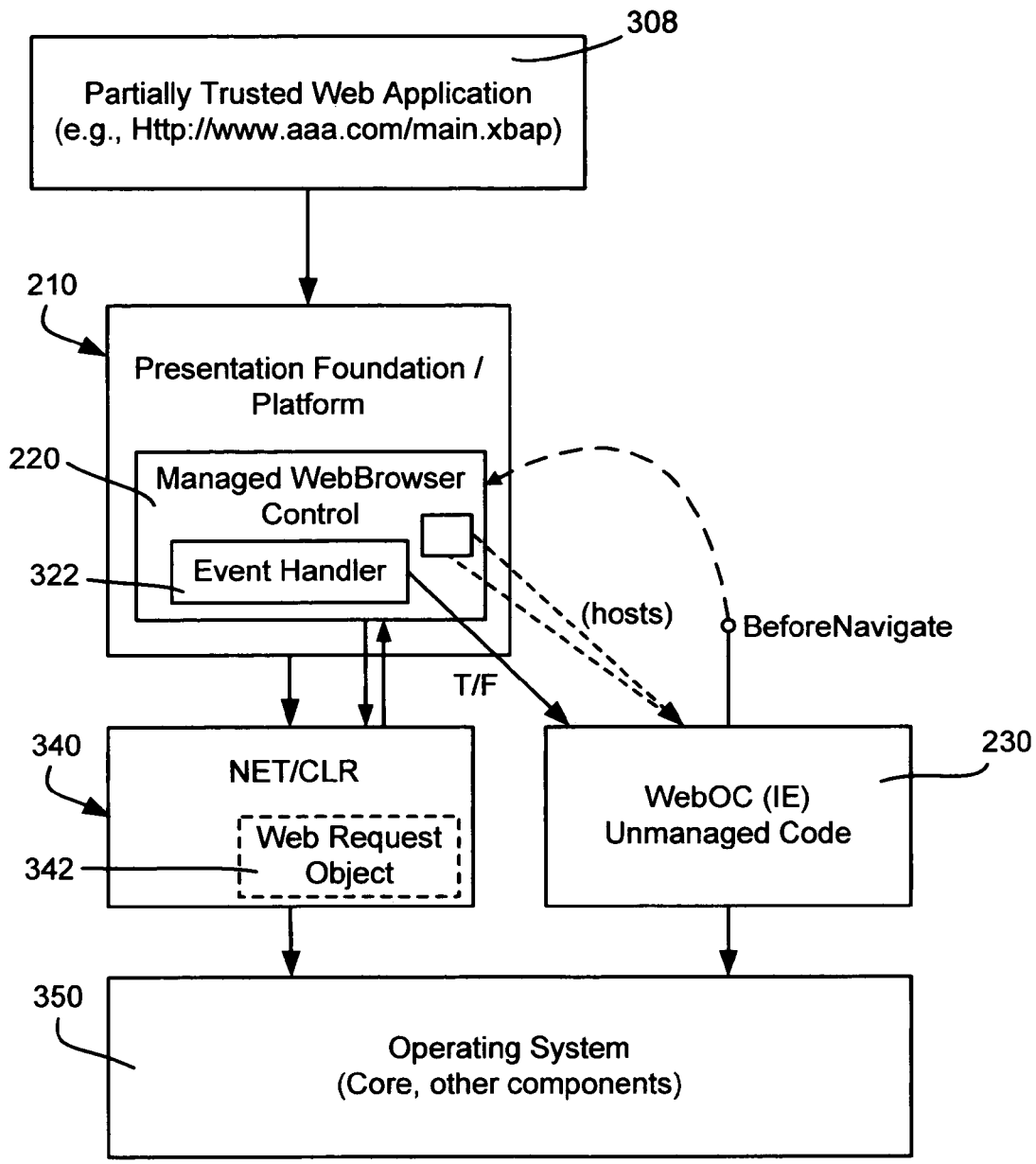
FIG. 3 is a block diagram generally representing an example implementation by which a web OLE control and web browser host that control lock an untrusted application program to its current site.

Consider then a managed code situation, such as generally represented in FIG. 3, in which some web browser application 308 (e.g., a Windows® Presentation Foundation-based, browser-hosted application such as a XAML Browser Application, having an .xbap extension) is deployed at http://www.aaa.com/main.xbap. To use an instance of the unmanaged web OLE control 230, the partially trusted web browser application 308 needs to invoke an instance of a managed WebBrowser control 220, which in turn hosts the unmanaged web OLE control 230. This is because as mentioned above, a partially trusted application does not have the permissions needed to run unmanaged code such as the web OLE control, and thus needs the fully trusted managed WebBrowser control 220 to run the web OLE control 230.

Continuing with this example, if the site 308 references a file such as file://c:/data/sensitive-info.htm in this environment, e.g., in which the WebBrowser control 220 hosts the web OLE control 230, without the technology described herein, the hosted web OLE control 230 will render this HTML file. This is because from the hosted web OLE control's perspective, it is a top-level control, which is rendering a local file on behalf of the local WebBrowser control 220. As a result of its being top-level, there is no zone elevation issue from the control's perspective. In other words, the web OLE control 230 is unaware of the fact that the ultimate host application 308 is a partially trusted application that came from some other zone; (note that this information cannot be readily ascertained by the web OLE control 230, as there is a hard, process boundary present). Since the web OLE control 230 is unaware of this zone, the web OLE control 230 cannot perform the calculations required to determine if zone-elevation is being attempted. As a result, the program launched from the Internet would be allowed to access anything, including other websites, as well as access content on the local machine, e.g., an application launched from "http://www.aaa.com," could access content from "http://www.bbb.com" as well as access a local file such as "file://c:/data/sensitive-image.jpg." This would be a significant security flaw.

As described herein, site locking technology prevents such access, essentially performing at least the security equivalent of mapping the code access security model to a zone-based model. To this end, before allowing the web browser object 230 to navigate to a site or file location, the WebBrowser control 220 traps each navigation event, essentially giving the web OLE control 230 the opportunity to ask whether navigating to a site is allowed, before navigating to that site.

In one example implementation, site locking is accomplished by having the WebBrowser control 220 trap (hook up to) a BeforeNavigate event or the like that is fired by the web OLE control 230, before the web OLE control navigates to anything, including subframe navigation. This event provides the WebBowser control with a URI that identifies where the navigation is about to occur. As described below, this event also accepts a return value, which the web OLE control 230 uses to determine whether the navigation request should continue (e.g., be passed to other operating system components 350) or should be failed.

In an example implementation, upon receiving the BeforeNavigate event, a handler 322 in the WebBrowser control 220 takes the URI from the event arguments, and uses the URI to check to see whether the partially trusted application 308 that is executing this code has the permission to access the URI. If it does have permission, the navigation is allowed to continue; if it fails, that is, the program 308 does not have permission, then the navigation is failed.

In the example .NET managed code environment of FIG. 2, permission is granted only for URIs corresponding to the site from which the web application program was launched, whereby this site-locking technique locks the web OLE control to the site from which the web browsing application was deployed. To this end, the managed WebBrowser control 220 requests that the .NET/CLR (common language runtime) framework create a managed web request object 342 on behalf of the partially trusted application using the event-specified URI. The managed object 342 (represented by a dashed block to indicate it may or may not be created) will only be created if the partially trusted application is navigating within its own site. If creation fails, the framework 340 will throw an exception that is trapped by the managed WebBrowser control 220.

The results of the object creation request are made known to the managed WebBrowser control 220 that requested it. If successful, the managed WebBrowser control 220 returns a "True" value or the like in response to the event, whereby the web OLE control 230 knows it is allowed to navigate to the site requested by the partially trusted web application 308. If "False" or the like is returned, the web OLE control 230 blocks the navigation, e.g., by not attempting the navigation and returning an errorcode or other message to the requesting entity, e.g., the partially trusted application 308.

Note that to determine whether the pending navigation is allowed, in one implementation, the WebBrowser control 220 takes advantage of existing .NET structure and functionality. For example, the .NET framework 340 includes code that, when given the parameters, uses string matching techniques or the like to determine whether the web request object may be created. In this example implementation, the .NET framework 340 is leveraged because .NET provides a consistent, uniform and carefully controlled mechanism that performs such functionality. It is alternatively feasible to have the managed WebBrowser control 220 perform the string matching itself, or have some other comparison code entity do so, however the risk in doing so is that a security hole may occur if the comparison code that checks for cross-site navigation contains a bug or otherwise may be compromised.

Figure 4:
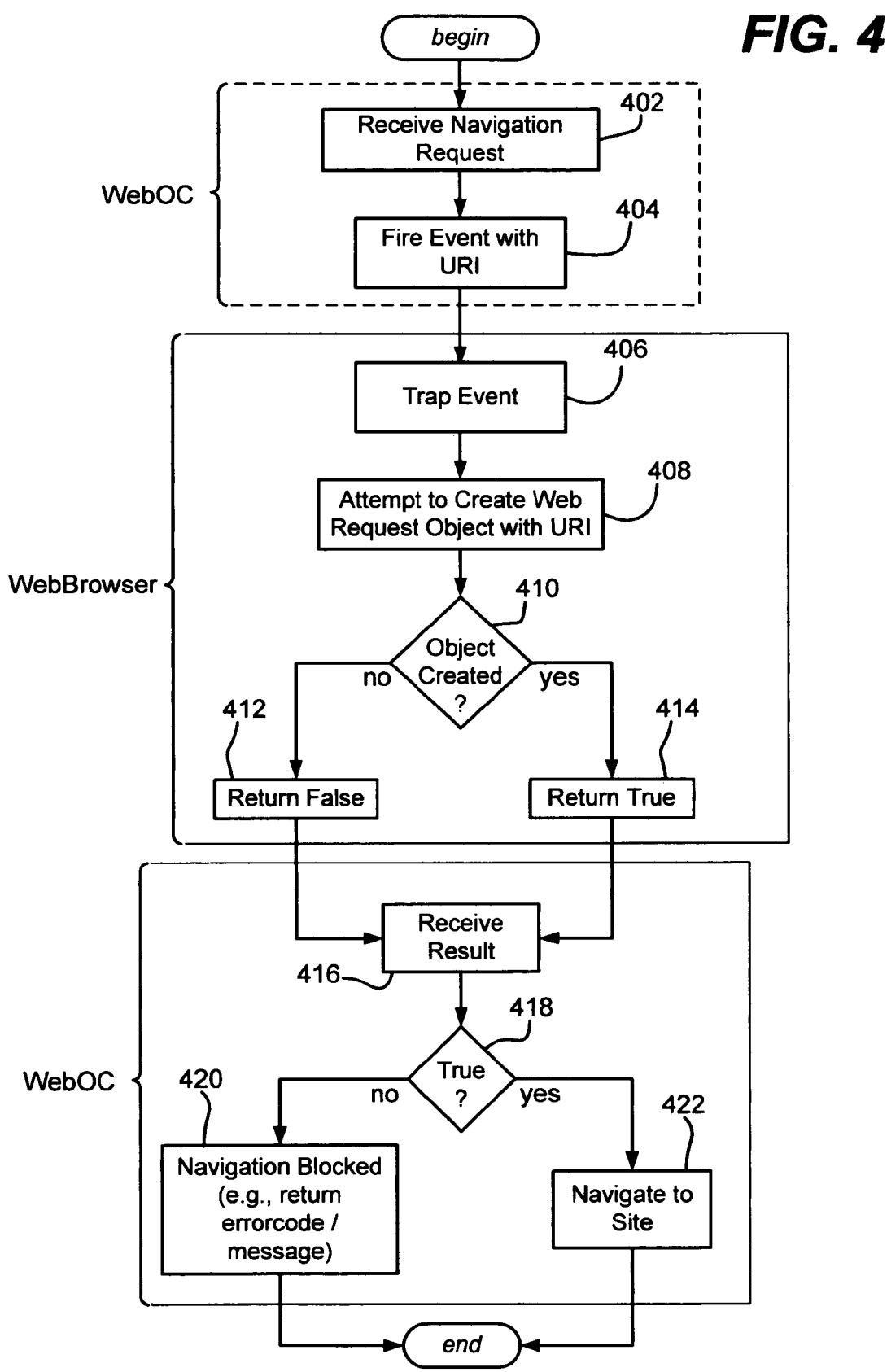
FIG. 4 is a flow diagram generally representing example steps in a web OLE control and web browser hosting that control to determine whether a requested navigation is to be allowed or blocked.

FIG. 4 summarizes these example operations in a flow diagram, beginning at step 402 where the web OLE control 230 receives a navigation request initiated by the partially trusted web application (or any partially trusted program) 308. As described above, before navigating, the web OLE control 230 fires an event to the managed WebBrowser control 220, which traps the event (step 406) for processing via the event handler 322.

Step 408 represents the request to create the web object 342 given the information of the current site/web program 308 and the requested URI. As described above, this may be accomplished by having the .NET/CLR attempt to create an object that allows the given site to communicate with this URI. As the site code 308 only has permission to communicate with a URI within its own site, if the object is not created (as evaluated at step 410), the WebBrowser 220 returns "False" via step 412, while if created, the WebBrowser 220 returns "True" via step 414.

Step 416 represents the (e.g., True or False) result of the creation being provided to the unmanaged hosted object control in response to the event that was fired at step 404. At step 418, if the result is false, step 420 is executed to block the navigation, and possibly return an errorcode/message. If true at step 418, step 422 is performed which represents navigating to the requested site. In this manner, a site is constrained to navigate/access only within its own site, e.g., http://www.aaa.com cannot navigate to content at http://www.bbb.com. Note that such cross-site navigation (within security zone limits) is still possible in this model, but requires the use of an IFRAME (e.g., embedded in the rendered content's HTML) to reference the other site.

As can be readily appreciated, various alternatives to the above object creation mechanism may be performed. For example, rather than checking for cross-site navigation, a zone elevation-like analysis may be performed by the WebBrowser control or by another entity on its behalf. In one alternative, existing Internet Explorer APIs can be used to determine whether zone elevation occurred. Other means for securely hosting the webOC control include inserting a web page above the hosted page (to force a condition such as a third party condition whereby existing security-related technology such as a zone-checking mechanism would operate), and changing the existing hosted web browser object so that it understands partially trusted web OLE control. Note that any alternative zone-based analyses will need to prevent zone elevation and constrain a program to its own zone, but will not by themselves constrain the program to its own site, and thus do not protect privacy as does site-locking, as described below.

More particularly, with respect to privacy, web pages create cookies that are persisted on the client machine. Provided that a given cookie has not expired, that cookie is then available to those web pages at a later date. Web pages (and sites) use cookies for various features such as user identification, shopping carts, and so forth. Blocking all cookies is often not desirable to users, as cookies provide many user conveniences.

To enable cookies, a DHTML (dynamic hypertext markup language) scripting API for a browser component such as Internet Explorer uses a mechanism that stores a cookie in the cookie cache via a document.cookie (of type string). Cookies coming back with an HTTP (hypertext transfer protocol) response are stored in a cookie cache, (e.g., the same cache as the Temporary Internet cache), and the cookie is associated with the domain that made the HTTP request. The next time an HTTP request is made to that domain, those cookies are automatically read and passed back along with the request;

these mechanisms use the public Wininet APIs of InternetGetCookieEx( ) and InternetSetCookieEx( ).

A privacy issue occurs in that Internet cookies can be used to track the web browsing habits of customers without the customers being aware of it. For example, if a user visits a site such as http://www.aaa.com/mailhome.htm, the mailhome.htm page may contain some tag, e.g., <img src=http://www.bbb.com/ad1.jpg>. When the page mailhome.htm was displayed, the browser component (e.g., Internet Explorer) made an additional request to get ad1.jpg. When that request was made, http://www.aaa.com was sent as the referrer. That request came back with a response which included one or more cookies in the HTTP header, and the browser component stored those cookies, noting that they came from http://www.bbb.com.

If that user then visits some other site, e.g., http://www.ddd.com/weather.htm, the weather.htm page may contain the tag <img src=http://www.bbb.com/ad2.jpg>. When weather.htm was displayed, the browser component makes an additional request to bbb.com for ad2.jpg (and this time the referrer is http://www.ddd.com). However, along with that request, the browser component also sends out any cookies that were previously persisted for http://www.bbb.com. What this does, essentially, is to allow bbb.com (a third party) to figure out from the user's visit to ddd.com that the user had previously visited aaa.com. In this way, one site can track the other sites a user has visited, which is a serious privacy violation.

Previous privacy solutions implemented P3P (Platform for Privacy Preferences), such as described in U.S. Pat. No. 6,959,420. In general, a third party flag (indicating if the set/get cookie API is for a third party page) is evaluated against a P3P compact policy from the HTTP header to detect a violation. However, P3P does not work for a scenario in which a control is itself hosted (e.g., by the managed WebBrowser code), because the hosted control thinks it is the top-level program, and hence first party.

As can be readily understood, site-locking solves this problem by blocking navigation to other sites, thereby forcing cookies written out by the top-level page in the web OLE control 230 to be first-party cookies (e.g., cookies from http://www.aaa.com in the above example) with respect to the partially trusted (e.g., XBAP) program 308. Note that any cookies written by content inside the hosted web OLE control 230 will go through the normal third party cookie (P3P) mitigation mechanism put in place by the web OLE control 230.

Turning to another issue, in partial trust, the Windows® Presentation Foundation 210 supports popups comprising windows that render on top of other rendered content. Popups are typically used to allow a user to interact with the window (e.g., corresponding to a dialog or other interactive mechanism) on an immediate basis. For example, menus are implemented using popups. Consider a partially trusted application (e.g., an XBAP web application) that hosts the WebBrowser control that points to some sensitive content, such as a banking websites home page. Such a page typically includes two or more text boxes, including one to enter a username and the other to enter a password.

A problem arises in that without the technology described herein, popups may be positioned over a valid site's content rendered via a web OLE control, spoofing the entire page or some portion thereof. In the above example, two popups (each of which containing nothing but a single text box) may be positioned by a malicious site precisely over the banking site's username and the password text boxes, whereby the malicious site would receive the user's credentials; that is, instead of going to the banking site, the user would be providing the credentials to the partially trusted XBAP. This is clearly a security problem.

To avoid this problem, when instantiating popups in partial trust, the popups are instantiated such that their windowing z-order is lower than the z-order of the lowest WebBrowser control, whereby the popup cannot receive user input in the event there is any overlap. To this end, in one implementation, existing Win32 APIs may be used to obtain and manage such z-order information such that the web browser control has a higher z-order than any popup.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer program product for use in controlling a computing system which includes a managed code environment, the computer program product comprising a computer storage medium having computer-executable instructions for implementing a method of controlling navigation requests by the unmanaged web OLE control on behalf of partially trusted code in order to prevent navigation to an undesirable location, the method comprising:

launching at the computing system a web browser that utilizes code access security (CAS) which defines program code as running with full trust or with partial trust, the web browser including a managed web browser control that hosts an unmanaged web object linking and embedding (OLE) control using a security model based on zones, wherein a website is categorized based on its website address as belonging to a particular zone which includes at least one of the Internet, intranet, a trusted or untrusted zone;

receiving at the browser a navigation request from a partially trusted web application program to navigate to a site;

the web OLE control creating an event prior to navigation to the requested site to provide the managed web browser control with a uniform resource identifier (URI) that identifies where the navigation is to occur before proceeding, and locking navigation to a set of web pages based on the current site until further authorization to proceed is obtained; and the managed web browser control of the computing system's browser then using the URI to check whether the partially trusted web application program has permission to access the URI and then returning to the web OLE control an indication as to whether the partially trusted web application program has permission to access the URI, and if so, the web OLE control permitting navigation by the partially trusted web application program to the URI, otherwise, the web OLE control blocking navigation to the URI for the navigation to continue to be locked to limit the navigation to a set of web pages based on the current site of the partially trusted web application program.

2. The computer program product of claim 1 wherein the managed web browser control processes data associated with the event to determine if a site identifier corresponds to the current site.

3. The computer program product of claim 2 wherein processing the data associated with the event comprises requesting creation of an object based on the site identifier.

4. A computer program product as defined in claim 3 wherein the managed web browser control includes an event handler that processes the event from the unmanaged web OLE control.

5. The computer program product of claim 3 wherein the object is created via a .NET framework.

6. The computer program product of claim 1 wherein locking the navigation to the set of web pages comprises inserting a page to create a condition that causes zone checking.

7. The computer program product of claim 1 wherein the implemented method further comprises managing the z-order of rendered content such that the managed web browser control is higher in z-order than any popup.

8. In a computing system which includes a managed code environment, a method of controlling navigation requests by the unmanaged web OLE control on behalf of partially trusted code in order to prevent navigation to an undesirable location, the method comprising:

launching at the computing system a web browser that utilizes code access security (CAS) which defines program code as running with full trust or with partial trust, the web browser including a managed web browser control that hosts an unmanaged web object linking and embedding (OLE) control using a security model based on zones, wherein a website is categorized based on its website address as belonging to a particular zone which includes at least one of the Internet, intranet, a trusted or untrusted zone;

receiving at the browser a navigation request from a partially trusted web application program to navigate to a site;

the web OLE control creating an event prior to navigation to the requested site to provide the managed web browser control with a uniform resource identifier (URI) that is used to identify whether the partially trusted web application is attempting to navigate within its own site or not, and if not the managed web browser control then locking navigation to a set of web pages based on the current site until further authorization to proceed is obtained; and the managed web browser control of the computing system's browser then using the URI to check whether the partially trusted web application program has permission to access the URI and then returning to the web OLE control an indication as to whether the partially trusted web application program has permission to access the URI, and if so, the web OLE control permitting navigation by the partially trusted web application program to the URI, otherwise, the web OLE control blocking navigation to the URI for the navigation to continue to be locked to limit the navigation to a set of web pages based on the current site of the partially trusted web application program.

9. The method of claim 8 wherein the managed web browser control includes a handler for processing the event, and wherein the handler processes by the event by requesting a framework to create a managed web request object using the URI and providing first data corresponding to a current location and second data corresponding to a requested location along with the object creation request to the framework, which then creates the requested object only when the current and requested locations sufficiently correspond.

10. The method of claim 9 wherein the locations sufficiently correspond and an object is created when the current location is within the same site as the requested location.

11. The method of claim 8 wherein locking the navigation to the set of web pages comprises inserting a page to create a condition that causes zone checking.

\* \* \* \* \*